(12) United States Patent
Simmons

(10) Patent No.: US 9,333,893 B2
(45) Date of Patent: May 10, 2016

(54) LOAD CARRYING ASSEMBLY

(71) Applicant: Guy Simmons, New London, MO (US)

(72) Inventor: Guy Simmons, New London, MO (US)

(*) Notice: Subject to any disclaimer, the term of this patent is extended or adjusted under 35 U.S.C. 154(b) by 0 days.

(21) Appl. No.: 14/451,519

(22) Filed: Aug. 5, 2014

(65) Prior Publication Data

US 2016/0039327 A1 Feb. 11, 2016

(51) Int. Cl.
*B60R 9/06* (2006.01)
*B60P 3/40* (2006.01)
*B62D 33/08* (2006.01)
*B60R 5/04* (2006.01)

(52) U.S. Cl.
CPC . *B60P 3/40* (2013.01); *B60R 5/041* (2013.01); *B60R 9/06* (2013.01); *B62D 33/08* (2013.01)

(58) Field of Classification Search
CPC ............. B60P 1/003; B60P 1/40; B60R 9/06; B62D 33/08
USPC ................................... 296/26.09, 1.03, 183.1
See application file for complete search history.

(56) References Cited

U.S. PATENT DOCUMENTS

| | | | | |
|---|---|---|---|---|
| 2,048,579 A * | 7/1936 | Webber | ................... | B60P 1/006 296/183.1 |
| 2,720,414 A | 2/1953 | Hart | | |
| 3,029,101 A | 8/1960 | Cook | | |
| 3,765,713 A * | 10/1973 | Suitt | ......................... | B60R 9/00 224/309 |
| D291,789 S | 9/1987 | Noga | | |
| 5,037,152 A * | 8/1991 | Hendricks | ................. | B60R 9/00 296/26.06 |
| 5,316,190 A * | 5/1994 | Bullock | .................... | B60P 3/42 211/182 |
| 5,678,743 A | 10/1997 | Johnson et al. | | |
| 5,743,503 A * | 4/1998 | Voeller | .................... | F16M 11/04 248/284.1 |
| 5,743,583 A * | 4/1998 | Lowe | ........................ | B60P 3/00 211/195 |
| 6,435,588 B1 | 8/2002 | Bauer | | |
| 6,698,810 B1 * | 3/2004 | Lane | ......................... | B60P 3/40 296/26.02 |
| 6,834,902 B2 | 12/2004 | Agan | | |
| 7,914,060 B2 * | 3/2011 | Scribner | .................... | B60P 3/40 224/519 |
| 2004/0007889 A1 * | 1/2004 | Hebert | .................... | B60P 1/003 296/26.09 |
| 2013/0175820 A1 | 7/2013 | Lepage | | |
| 2014/0305979 A1 * | 10/2014 | Marr, Jr. | ................... | B60R 9/00 224/405 |

FOREIGN PATENT DOCUMENTS

CA          2153029          1/1996

OTHER PUBLICATIONS

Title of Source: www.truckaccessorizer.com Product Name: Trail FX Extend-A-Truck.

* cited by examiner

*Primary Examiner* — Pinel Romain

(57) ABSTRACT

A load carrying assembly for mounting on a pickup such that the pickup may safely carry an object that is longer than a bed on the pickup includes a pair of rails coupled to a bed of the pickup. A pair of horizontal arms is movably coupled to an associated one of the pair of rails. A support is coupled between the pair of horizontal arms. The support is positionable at a selected distance from the bed of the pickup. The support supports an object so the object does not prevent a hazard to other vehicles.

10 Claims, 5 Drawing Sheets

LOAD CARRYING ASSEMBLY

BACKGROUND OF THE DISCLOSURE

Field of the Disclosure

The disclosure relates to carrying devices and more particularly pertains to a new carrying device for mounting on a pickup such that the pickup may safely carry an object that is longer than a bed on the pickup.

SUMMARY OF THE DISCLOSURE

An embodiment of the disclosure meets the needs presented above by generally comprising a pair of rails coupled to a bed of a pickup. A pair of horizontal arms is movably coupled to an associated one of the pair of rails. A support is coupled between the pair of horizontal arms. The support is positionable at a selected distance from the bed of the pickup. The support supports an object so the object does not prevent a hazard to other vehicles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
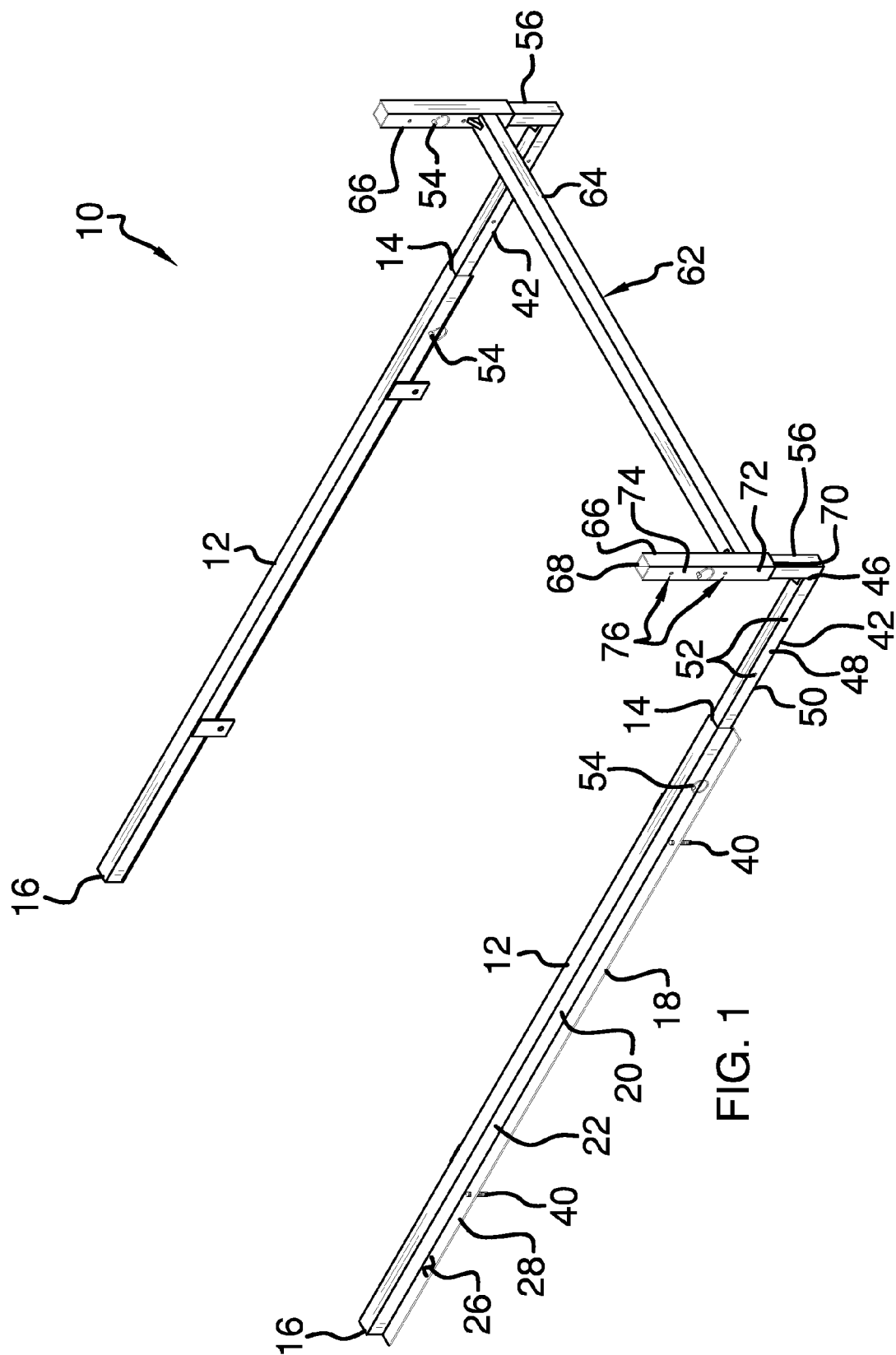
FIG. 1 is a perspective view of a load carrying assembly according to an embodiment of the disclosure.
Figure 2:
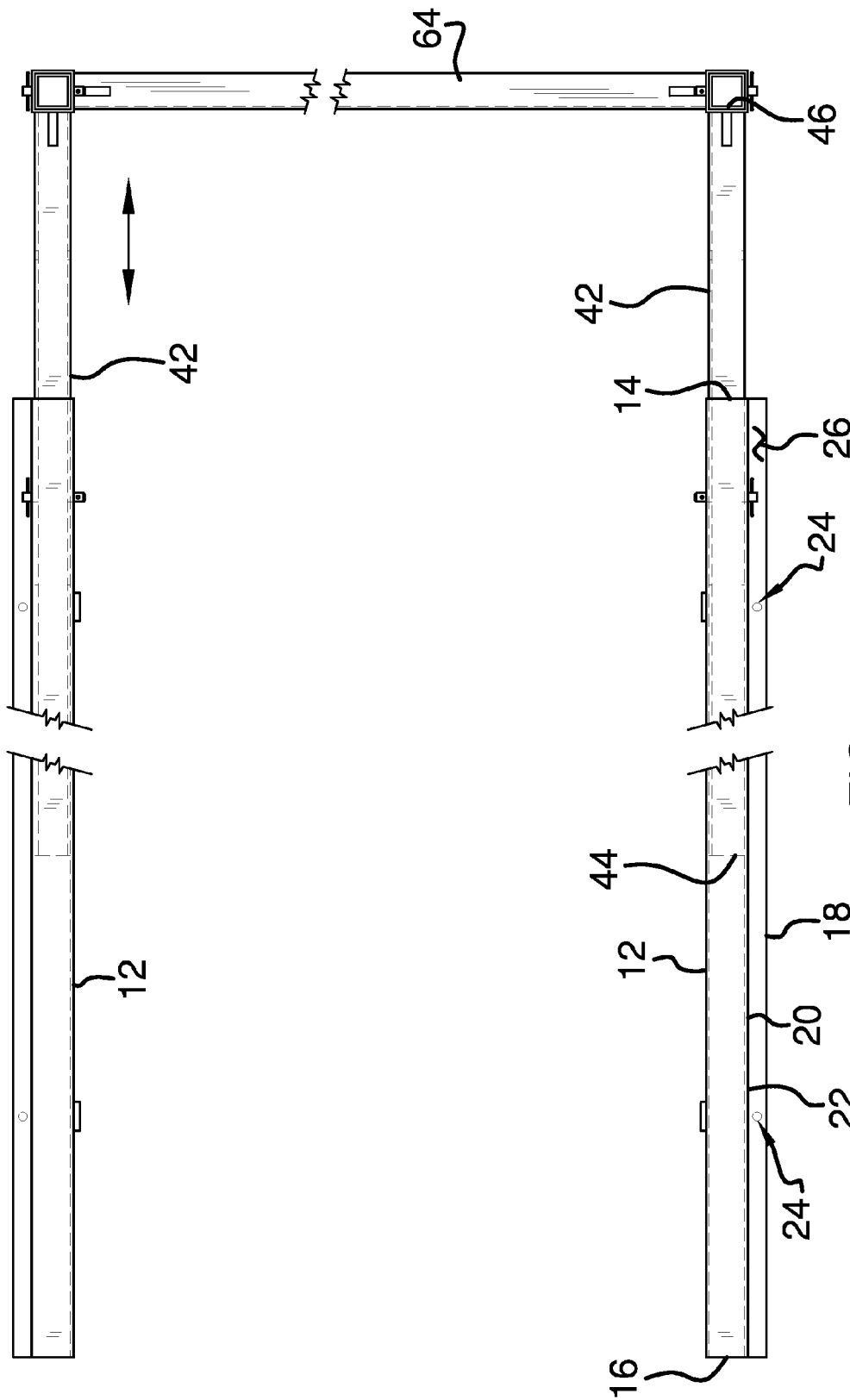
FIG. 2 is a top view of an embodiment of the disclosure.
Figure 3:
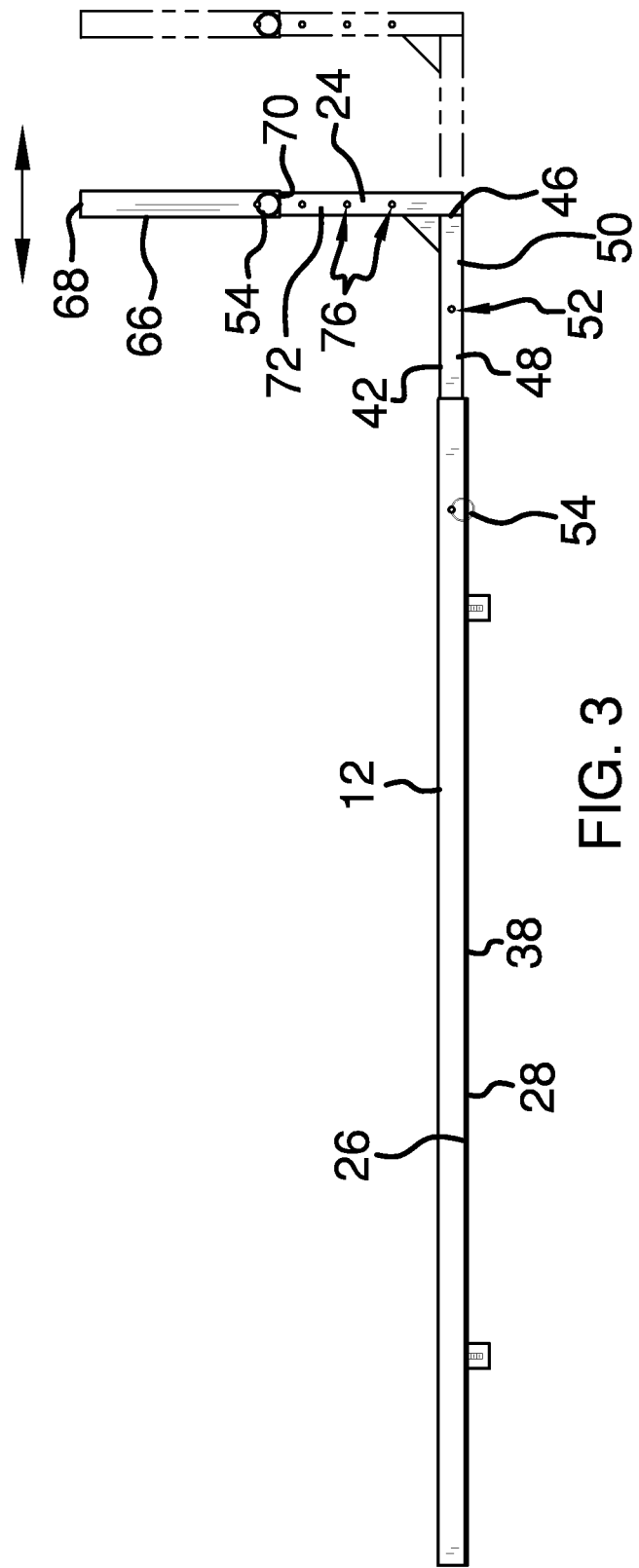
FIG. 3 is a left side view of an embodiment of the disclosure.
Figure 4:
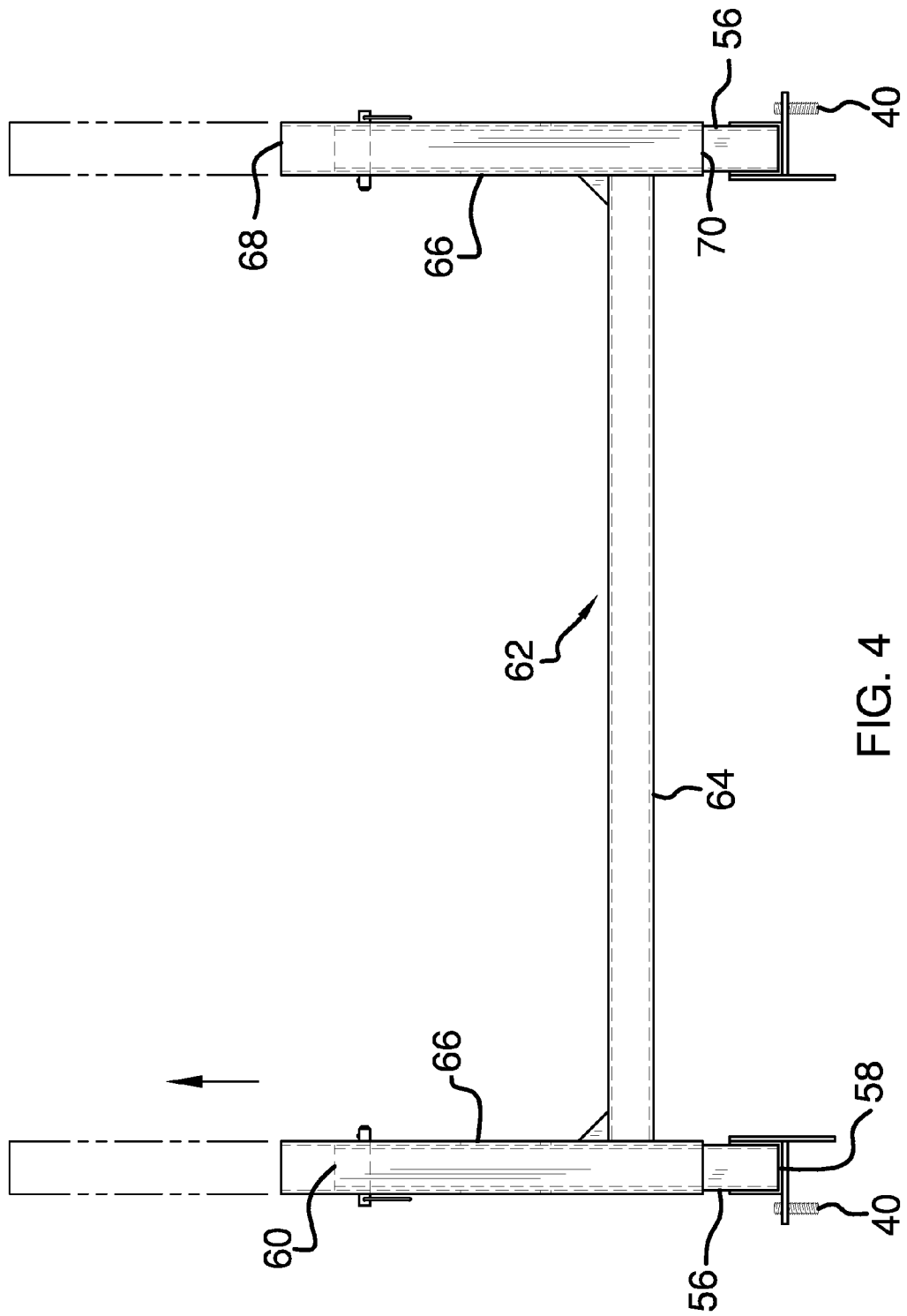
FIG. 4 is a back view of an embodiment of the disclosure.
Figure 5:
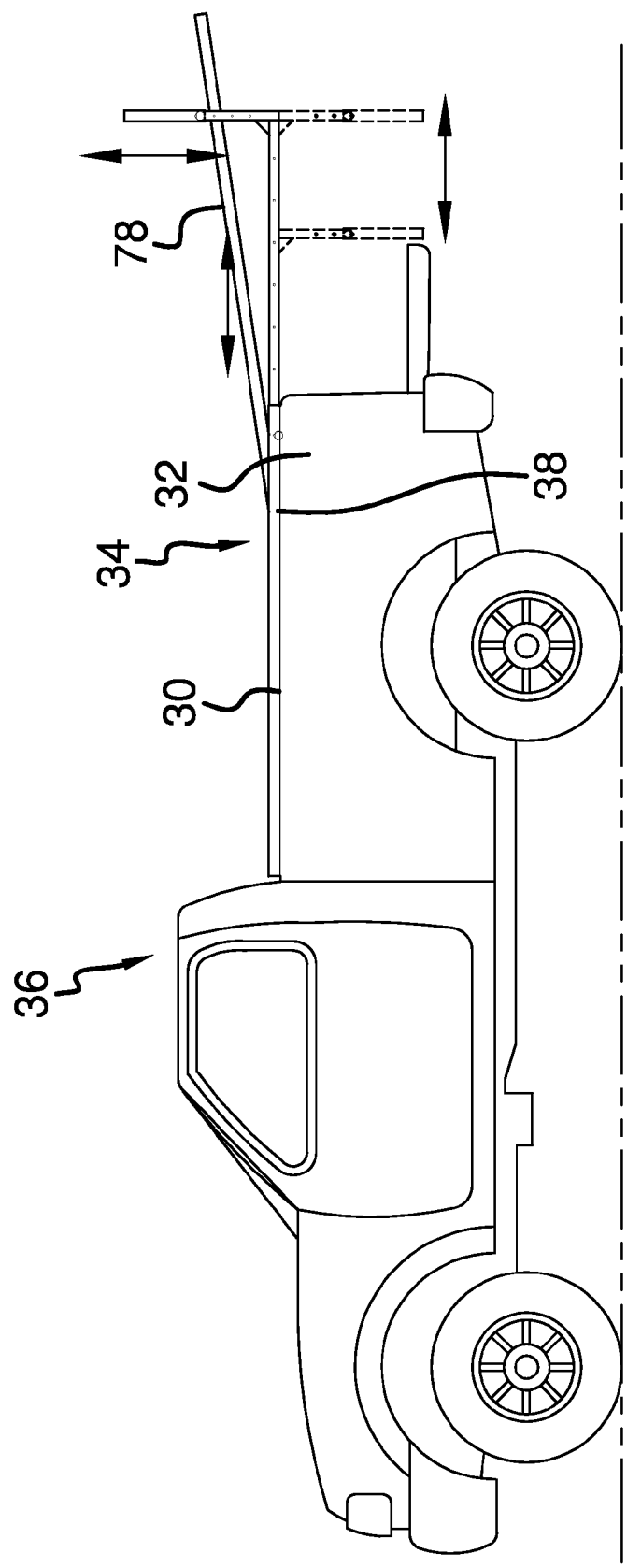
FIG. 5 is an in-use view of an embodiment of the disclosure.

With reference now to the drawings, and in particular to FIGS. 1 through 5 thereof, a new carrying device embodying the principles and concepts of an embodiment of the disclosure and generally designated by the reference numeral 10 will be described.

As best illustrated in FIGS. 1 through 5, the load carrying assembly 10 generally comprises a pair of rails 12. Each of the pair of rails 12 has a first end 14 and a second end 16. The first end 14 of each of the pair of rails 12 is open. Each of the pair of rails 12 is substantially hollow.

A pair of lips 18 is each coupled to and extends laterally away from a first lateral side 20 of an outer wall 22 of an associated one of each of the pair of rails 12. Each of the pair of lips 18 extends between the first 14 and second 16 ends of an associated one of the pair of rails 12. Each of the pair of lips 18 has a pair of fastener apertures 24 extending through a top surface 26 and a bottom surface 28 of each of the pair of lips 18. Each of the pair of fastener apertures 24 on each of the pair of lips 18 is positioned proximate an associated one of the first 14 and second 16 ends of an associated one of each of the pair of rails 12.

Each of the pair of rails 12 is positioned on an upper side 30 of an associated one of a pair of walls 32 of a bed 34 on a pickup 36. A bottom side 38 of the outer wall 22 of each of the rails 12 abuts the upper side 30 of the associated one of the pair of walls 32 of the bed 34 of a pickup 36. A plurality of fasteners 40 extends through an associated one of the pair of fastener apertures 24 in the pair of lips 18. The plurality of fasteners 24 engages the upper side 30 of the pair of walls 32 of the bed 34 on the pickup 36. The plurality of fasteners 40 retains the pair of rails 12 on the bed 34 of the pickup 36.

A pair of horizontal arms 42 is provided. Each of the pair of horizontal arms 42 has an inserted end 44 and a free end 46. Each of the pair of horizontal arms 42 is elongated. The first end 14 of each of the pair of rails 12 insertably receives the inserted end 44 of an associated one of the pair of horizontal arms 42. The pair of horizontal arms 42 are slidably coupled to the pair of rails 12.

A first oblique side 48 of an outermost wall 50 of each of the pair of horizontal arms 42 has a plurality of pin apertures 52 extending therethrough. The plurality of pin apertures 52 are evenly spaced apart and distributed between the inserted end 44 and the free end 46 of an associated one of each of the pair of horizontal arms 42. A pair of pins 54 each extends through the an associated one of the pair of rails 12 and engages a selected one of the plurality of pin apertures 52 in an associated one of the pair of horizontal arms 42. The pair of pins 54 retains the pair of horizontal arms 42 at a selected position with respect to the pair of rails 12.

A pair of vertical arms 56 each has a lowermost end 58 and an uppermost end 60. Each of the pair of vertical arms 56 is coupled to the free end 46 of an associated one of the pair of horizontal arms 42. The uppermost end 60 of each of the pair of vertical arms 56 is directed upwardly from the associated one of the pair of horizontal arms 42. The pair of vertical arms 56 are each positionable a selected distance away from the first end 14 of each of the pair of rails 12.

A support 62 is provided. The support 62 includes a central member 64 extending between each of a pair of end members 66 of the support 62. The support 62 has a U-shape. Each of the pair of end members 66 of the support 62 has a top end 68 and a bottom end 70. Each of the top 68 and bottom 70 ends of each of the pair of end members 66 is open. The pair of end members 66 of the support 62 is each substantially hollow.

The bottom end 70 of each of the pair of end members 66 of the support 62 insertably receives the uppermost end 60 of an associated one of the pair of vertical arms 56. The support 62 is slidably coupled to each of the pair of vertical arms 56. The central member 64 of the support 62 extends laterally between each of the pair of vertical arms 56.

A first edgeways side 72 of an exterior wall 74 of each of the pair of end members 66 of the support 62 has a plurality of pin openings 76 extending therethrough. The plurality of pin openings 76 is evenly spaced apart and distributed between the top 68 and bottom 70 ends of the pair of end members 66. A pair of pins 54 is extendable through a selected one of the plurality of pin openings 76 in each of the pair of end members 66. The pair of pins 54 abuts the uppermost end 60 of an associated one of the pair of vertical arms 56. The pair of pins 54 retains the central member 64 of the support 62 at a selected height from the bed 34 of the pickup 36.

In use, the support 62 is positioned at the selected height from the bed 34 of the pickup 36. The central member 64 of the support 62 supports an object 78 when the object 78 is positioned within the bed 34 of the pickup 36. The support 62 prevents the object 78 from preventing a hazard to other vehicles. Additionally, the support 62 prevents the object 78 from falling out of the bed 34 of the pickup 36. The assembly 10 is utilized to carry the object 78 that has a length that is greater than a length of the bed 34 of the pickup 36.

Alternatively, the pair of horizontal arms 42 are positionable within the pair of rails 12 so the pair of vertical arms 56 extends downwardly from the pair of rails 12. The support 62 is positioned below the pair of rails 12. Each of the end members 66 of the support 62 extends downwardly from the pair of vertical arms 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A load carrying assembly configured to be mounted on a pickup such that the pickup may safely carry an object that is longer than a bed on the pickup, said assembly comprising:
   a pair of rails coupled to the bed of the pickup;
   a pair of horizontal arms movably coupled to an associated one of said pair of rails;
   a pair of vertical arms each having a lowermost end and an uppermost end, each of said pair of vertical arms being coupled to a free end of an associated one of said pair of horizontal arms such that said uppermost end of each of said pair of vertical arms is directed upwardly from said associated one of said pair of horizontal arms; and
   a support having a pair of end members, each of said end members being coupled to said vertical arms at an adjustable distance perpendicular to said horizontal arms, said support having a central member extending between each of said end members of said support, said central member of said support being positionable at a selected distance from the bed of the pickup wherein said central member of said support is configured for supporting the object extending upwardly and rearwardly from the bed such that the object does not prevent a hazard to other vehicles.

2. The assembly according to claim 1, further comprising each of said pair of rails having a first end and a second end, said first end of each of said pair of rails being open, each of said pair of rails being substantially hollow.

3. The assembly according to claim 1, further comprising a pair of lips each coupled to and extending laterally away from a first lateral side of an outer wall of an associated one of each of said pair of rails.

4. The assembly according to claim 3, further comprising each of said pair of lips extending between a first end and a second end of an associated one of said pair of rails.

5. The assembly according to claim 1, further comprising each of said pair of rails being positioned on an upper side of an associated one of a pair of walls of the bed on the pickup such that a bottom side of an outer wall of each of said rails abuts the upper side of the associated one of the pair of walls of the bed of the pickup.

6. The assembly according to claim 1, further comprising each of said pair of horizontal arms having an inserted end and a free end, each of said pair of horizontal arms being elongated.

7. The assembly according to claim 1, further comprising a first end of each of said pair of rails insertably receiving an inserted end of an associated one of said pair of horizontal arms such that said pair of horizontal arms are slidably coupled to said pair of rails.

8. The assembly according to claim 1, further comprising each of said pair of end members of said support having a top end and a bottom end, each of said top and bottom ends of each of said pair of end members being open, each of said pair of end members of said support being substantially hollow.

9. The assembly according to claim 1, further comprising:
   a bottom end of each of said pair of end members of said support insertably receiving an uppermost end of an associated one of said pair of vertical arms such that said support is slidably coupled to each of said pair of vertical arms; and
   each of a pair of pins being positionable to extend through an associated one of said end members and said vertical arms wherein said support is secured at a selectable position on said vertical arms.

10. A load carrying assembly configured to be mounted on a pickup such that the pickup may safely carry an object that is longer than a bed on the pickup, said assembly comprising:
    a pair of rails each having a first end and a second end, said first end of each of said pair of rails being open, each of said pair of rails being substantially hollow;
    a pair of lips each coupled to and extending laterally away from a first lateral side of an outer wall of an associated one of each of said pair of rails, each of said pair of lips extending between said first and second ends of an associated one of said pair of rails;
    each of said pair of rails being positioned on an upper side of an associated one of a pair of walls of the bed on the pickup such that a bottom side of an outer wall of each of said rails abuts the upper side of the associated one of the pair of walls of the bed of the pickup;
    a pair of horizontal arms each having an inserted end and a free end, each of said pair of horizontal arms being elongated, said first end of each of said pair of rails insertably receiving said inserted end of an associated one of said pair of horizontal arms such that said pair of horizontal arms are slidably coupled to said pair of rails;
    a pair of vertical arms each having a lowermost end and an uppermost end, each of said pair of vertical arms being coupled to said free end of an associated one of said pair of horizontal arms such that said uppermost end of each of said pair of vertical arms is directed upwardly from said associated one of said pair of horizontal arms;
    a support having a pair of end members, each of said end members being coupled to said vertical arms at an adjustable distance perpendicular to said horizontal arms, said support having a central member extending between each of said end members of said support, said central member of said support being positionable at a selected distance laterally from the bed of the pickup wherein said central member of said support is configured for supporting the object extending upwardly and rearwardly from the bed such that the object does not prevent a hazard to other vehicles;

each of said pair of end members of said support having a top end and a bottom end, each of said top and bottom ends of each of said pair of end members being open, each of said pair of end members of said support being substantially hollow, said bottom end of each of said pair of end members of said support insertably receiving said uppermost end of an associated one of said pair of vertical arms such that said support is slidably coupled to each of said pair of vertical arms, said central member of said support extending laterally between each of said pair of horizontal arms; and each of a pair of pins being positionable to extend through an associated one of said end members and said vertical arms wherein said support is secured at a selectable position on said vertical arms.

\* \* \* \* \*